United States Patent Office 2,858,268
Patented Oct. 28, 1958

2,858,268

MANUFACTURE OF SPECIAL NAPHTHAS

Weldon Grant Annable, Mundelein, Ill., assignor to The Pure Oil Company, Chicago, Ill., a corporation of Ohio No Drawing. Application June 1, 1954
Serial No. 433,814

6 Claims. (Cl. 208—136)

The present invention relates to a process for catalytically hydroreforming hydrocarbon mixtures containing sulfur compounds followed by solvent extraction to form products which have maximum aromaticity and a minimum amount of corrosive sulfur compounds as evidenced by their ability to pass the distillation-corrosion test.

It is known in the prior art to treat various types of sulfur-containing hydrocarbons with catalytic or non-catalytic contact materials including metal oxides and sulfides, fuller's earth, clays, and bauxite under conditions to remove or convert sulfur compounds to forms which are readily removable from the hydrocarbons. During such processes, when conducted under catalytic conditions particularly, it is taught that the appearance of hydrogen sulfide in the effluent treated vapors therefrom is an indication that the contact material has been substantially converted to the sulfide and the treatment should be terminated when or before a substantial amount of hydrogen sulfide appears in the treated products. In some processes it is said to be advantageous to remove the hydrogen sulfide and other by-products of the desulfurization reactions before they have had a chance to recombine with the hydrocarbons and form corrosive products. In some instances, the desulfurization reaction is terminated at a point before 60 to 100 percent completion of the desulfurization reaction.

According to the present invention, it has been found that, in order to produce naphtha products which not only have maximum aromaticity but which are characterized by their ability to pass the critical distillation-corrosion test, certain precautions must be taken. These results are attained by subjecting the naphthas to hydroreforming conditions and terminating the reaction or otherwise discontinuing same or the collection of naphthas therefrom before hydrogen sulfide becomes a product of the reaction. The invention is based on the discovery that the hydroreforming reaction can be successfully applied to naphthas to produce non-corrosive products while at the same time taking advantage of the increase in aromatic compounds from such hydroreforming if the reaction is conducted in a manner such that no hydrogen sulfide appears in the products. In other words, it has been found that the principal desulfurization reaction taking place during hydroreforming, which under normal conditions is characterized by the production of hydrogen sulfide, is preceded by an initial reaction in which hydrogen sulfide and other corrosive sulfur compounds are not by-products and the resultant treated hydrocarbons are non-corrosive and free of those types of sulfur compounds which give a positive distillation-corrosion test. Another advantage of the invention is that increased yields of highly aromatic naphthas are produced which are solvent refined to separate naphthas of desired aromaticity for industrial use and extracts which may be used for blending or other purposes.

Accordingly, it is the primary object of this invention to provide a process of producing improved naphthas of low corrosive sulfur content.

Another object of this invention is to provide a hydroreforming process to produce improved naphthas.

A third object of the invention is to provide a method of producing naphthas which pass the distillation-corrosion test.

A further object of the invention is to provide a process involving a modified hydroreforming reaction step and a solvent extraction step to produce acceptable sweet, odor-free, non-corrosive, sulfur-free special solvent naphthas.

These and other objects of the invention will become apparent as the description thereof proceeds.

Crude petroleum is the source of a large number of products ranging from simple distillation products including pure hydrocarbons to high molecular weight natural and synthetic resins, elastomers, and polymers produced through physical and chemical transformations. Widely known petroleum derived products include gasoline, kerosine, diesel fuels, lubricating oils, and heavy tars. In many instances, the products obtained from petroleum are employed as reactants in the synthesis of additional petroleum derivatives and chemicals and a large number of products of petroleum are used directly without extended treatment or modification. Petroleum naphthas comprise a wide variety of such latter products used extensively in the dyeing, rubber, extraction, protective coating, and allied industries. A large portion of the petroleum naphthas used is the straight-run naphthas which are selected fractions of the lower boiling, more volatile constituents of crude petroleum. Although a wide variety of hydrocarbon mixtures may be successfully treated in accordance with the herein described process, the invention is particularly directed to a method of preparing such straight-run naphthas and to naphtha compositions of this variety and, accordingly, the term naphthas as used herein shall mean straight-run petroleum naphthas, or their equivalents.

If the preparation of naphthas from petroleum is confined to physical means, the products inevitably contain other types of organic and inorganic compounds due to the complex nature of petroleum which have been found to be deleterious as far as certain end uses of the naphthas are concerned and necessitate the application of additional refining steps. Even with such additional refining, it is exceedingly difficult to prepare naphthas which meet the exacting specifications that have been established by the industry. Of these deleterious non-hydrocarbon compounds the sulfur and sulfur-containing constituents are generally the most persistent and cling tenaciously to any environment in which they exist, imparting objectionable odor, corrosiveness, color, and other physical and chemical properties thereto. The odor of naphthas is important; however, no standard test exists to cover this property and the odor of a well refined naphtha is generally described as sweet.

Tests have been devised to determine both quantitatively and qualitatively the presence of these odious compounds in an attempt to control the properties and quality of naphthas from petroleum sources. For this purpose, various copper strip corrosion tests and the "doctor" test have been used. Procedures established by A. S. T. M. may be used to determine the content and distribution of these sulfur compounds. Perhaps the most critical and rigorous qualitative test for determining the presence of sulfur compounds in naphthas is the distillation-corrosion test, known also as the Philadelphia test, the Amsco corrosion test, or the full boiling range corrosion test—by any name, a species of copper strip corrosion test. The test, widely applied by the manufacturers, distributors, and users of specialty naphthas, is carried out by the addition of a small pure copper coupon to an ordinary A. S. T. M. distillation flask containing 100 cc. of the naphtha to be tested. The copper strip is so positioned in the flask that one end of the strip contacts the residue at the end of the distillation, and the distillation is conducted according to A. S. T. M. D86–38 as described in A. S. T. M. Standards on Petroleum Products and Lubricants, published by the American Society for Testing Materials, Philadelphia, Pennsylvania.

At the completion of the test, wherein the flask has been heated to dryness, the color of the copper strip is an indication of the relative amount of corrosive sulfur compounds present in the naphtha sample. A negative test is shown by the presence of a very slight or moderate tarnish on the strip and stamps the naphtha as satisfactory. If the copper strip becomes moderately blackened, the results are interpreted as positive or unsatisfactory. The production of a slightly tarnished or slightly colored or corroded strip, indicated by a dark orange with peacock colorations thereon, is termed borderline and as such denotes a naphtha which is not acceptable and must be further refined. The market is limited for off-specification naphthas and further refining is expensive since even then there is no assurance that the product will pass the severe distillation-corrosion test.

The subjection of high sulfur content naphthas to various refining and sweetening operations which may include oxidation and extraction methods, or the recycling of rejected off-specification naphthas back through such a process, does not produce acceptable naphthas because the sulfur compounds remaining are corrosive in nature. High sulfur content naphthas usually have a poor odor as well as other undesirable properties. If straight-run naphthas from high sulfur crudes are subjected to other more severe refining methods, the resulting products do not pass the distillation-corrosion test. Even subjecting these naphthas to the usual desulfurization treatments involving vapor or liquid phase contact with clay or catalytic materials having strong affinity for effecting desulfurization does not produce a satisfactory product. In general, with increase in the sulfur content above about 0.1 percent total sulfur, calculated to include sulfur compounds, free sulfur, or residual sulfur, further refining of a naphtha stock, such as by ordinary catalytic desulfurization, is necessary in addition to merely "sweetening" in order to obtain a product meeting the distillation-corrosion test. By "sweetening" is meant the transformation of corrosive sulfur compounds into forms which do not give a positive distillation-corrosion test, which may or may not include an actual removal of the sulfur compounds from the naphtha. In such cases, the aromatics content may be too high for proper solvency of the naphtha. In other cases, the solvency may be too low because of a deficiency of aromatics.

Accordingly, to overcome these and related problems the present invention comprises subjecting the hydrocarbon mixture to be treated to a catalytic hydroreforming operation whereby at least about 90 percent of the sulfur content is removed, continuing said hydroreforming as long as the effluent naphtha therefrom is non-corrosive, regardless of other characteristics of the product, and then subjecting the reformed product to a solvent extraction step, either before or after the naphtha from the hydroreforming step has been fractionated into various fractions.

The hydroreforming step is conducted by vaporizing the naphtha and passing the vapors over a suitable catalyst maintained in a reaction zone at a temperature of about 900° to 1000° F. and pressures ranging from 50 to 500 p. s. i. g., space velocities ranging from 0.5 to 3.0 with a hydrogen circulation rate of about 3000 s. c. f./ barrel of feed. Due to the nature of the reaction wherein some dehydrogenation occurs, sufficient hydrogen will generally be produced to maintain all phases of the transformations taking place in the reaction zone. If necessary, hydrogen from an outside source may be added, the catalyst used for this step may be any one or mixtures of known reforming catalysts. Suitable catalysts for this operation includes oxides of metals of Groups VI, VII, and VIII of the Periodic Chart of the Atoms, published in 1941, by W. M. Welch Manufacturing Company. These catalysts may be used alone or supported on various carriers such as alumina, bauxite, silica, clays, and the like. Preferred catalysts comprise molybdena, cobalt molybdate, and copper molybdate, which may be used with or without a support.

Catalytic reforming or hydroreforming processes, distinguishable at least in part from one another in the reaction conditions and the presence or absence of hydrogen in the reaction zone, are so well known that no further description is thought necessary. By hydroreforming as used herein is meant an operation conducted at elevated temperature (below substantial hydrolysis or decomposition) and pressures in the presence of a solid catalyst and excess hydrogen, wherein a hydrocarbon fraction of increased aromaticity is obtained and wherein there is little or no net consumption of hydrogen. The main reaction involved is one of dehydrogenation of the naphthenes to the corresponding aromatics and the hydrogenation of the olefinic materials to the corresponding paraffins. Some isomerization of olefins and paraffinic hydrocarbons occurs and also isomerization of the naphthenic compounds, for example, the conversion of ethylcyclo pentane to methyl cyclohexane. The reaction also involves desulfurization, alkylation, and dealkylation transformations.

In accordance with the present invention, the catalytic contact above described is continued until just before hydrogen sulfide becomes a product of the reaction. This point is determined by experiment or may be calculated. Actual testing for the presence of hydrogen sulfide in the effluent may be done by means of lead acetate paper which is very sensitive and turns black in the presence of very small amounts of hydrogen sulfide. The doctor test ASTM–D484–52 would be used for this purpose when conducting the reaction on a commercial scale. For example, the maximum yield of non-corrosive products, as indicated by the distillation-corrosion test, can be determined by preliminary test runs designed to ascertain the number of barrels of non-corrosive product per unit weight of catalyst obtainable from a charge stock of a given sulfur content. Plant scale runs can then be conducted to the same yield or just short of this yield. The catalyst may be regenerated and reused in the process, which contemplates known fixed bed, plural bed, and fluidized zone techniques both as to the main reaction and the regeneration. The duration of the hydroreforming step depends upon the sulfur content of the naphtha charge, i. e., the lower the sulfur content, the longer the duration of hydroreforming before regeneration and vice versa.

Regarding catalyst life and the necessity for regeneration, it may be stated that the catalyst may be used until the effluent naphtha is no longer corrosive as evidenced by the distillation-corrosion test. The reactions taking place are complicated and with a used catalyst the effluent may become corrosive before the time set to terminate the reaction. Accordingly, it is recommended that the catalyst be regenerated after each pass, when batch operations are used. For fluidized bed operation the catalyst may be withdrawn for separate regeneration and new or regenerated catalyst added to the fluidized zone at such a rate as to keep the catalyst activity therein or sulfur content thereof at a constant level. The regeneration is conducted in the ordinary manner by heating the catalyst to elevated temperatures of about 1000° F. in the presence of oxygen-containing gases. The regeneration time is regulated until the sulfur content of the catalyst is less than about 10 weight percent of the quantity of active catalyst component present. It is preferable when using either fixed bed or fluid bed operation that the regeneration be conducted until or at such a rate that the sulfur content is less than about 1.0 percent by weight on the above basis.

In carrying out the present invention, any hydrocarbon material from which naphthas or solvents or similar products may be obtained can be used wherein the objective is to overcome the tendency toward the formation or carry-over of those types of sulfur compounds which cause a positive distillation-corrosion test. Crude oil is one source of material from which large quantities of solvents and naphthas are produced. It is preferred to prolong catalyst life so that the more volatile components and the high boiling residues present be removed by fractionation or other methods prior to treatment in accordance with this invention. For example, a crude oil containing from 1.0 to 3.0 or as high as 7.0 weight percent of sulfur is fractionated to obtain a wide boiling range virgin or straight run naphtha having an end boiling point of about 500° F. A gas oil fraction may be used which may boil between about 500° and 700° F. Kerosine fractions may also be used. Preferably a straight-run naphtha fraction boiling between 110° and 450° F. is used.

The boiling range of the particular fraction removed for treatment in accordance with this invention may be varied somewhat from the boiling ranges given depending upon the relative amounts of specialty naphtha, rubber solvent, V. M. and P. naphthas desired. By narrowing the boiling range of the virgin naphtha to within 100° to 250° F., the process may be directed to obtaining rubber solvents almost exclusively. On the other hand, by starting with a fraction boiling between 200° and 400° F., the process may be directed to production of V. M. and P. solvents and specialty naphthas. In one specific embodiment of the invention, the treatment of the entire first fraction boiling up to 500° F. or more to produce a wide variety of products ranging from rubber solvents up to high boiling specialty naphthas including, for example, petroleum ether 90°–140° F., Special Textile Spirits 180°–210° F., Light Mineral Spirits 290°–330° F., Stoddard Solvent 310°–385° F., and High Flash Dry Cleaning Solvent 360°–400° F., all being non-corrosive, odorless, and meeting the rigorous requirements of the industry, is contemplated.

These hydrocarbon mixtures may contain from about 1.0 to less than 0.025 percent total sulfur represented by various sulfur compounds including mercaptans, disulfides, and residual sulfur, etc. In treating naphthas having more than about 0.1 to 1.0 percent total sulfur, it may be found that the hydroreforming catalyst life per pass may be shortened, in which event a preliminary desulfurization treatment may be applied to the materials before hydroreforming in accordance with the invention. The invention is particularly applicable to so-called high sulfur naphthas containing from about 1.0 percent to about 0.025 percent total sulfur.

In order to demonstrate the invention, a first portion of a 100°–400° F. boiling range straight-run naphtha was hydroreformed at 930° F. and 225 p. s. i. g., using a space velocity of .6, and a hydrogen circulation rate of 2800 s. c. f./bbl. over a catalyst comprising molybdenum oxide on alumina. The hydroreforming reaction was conducted until hydrogen sulfide appeared as a product. A second portion of this naphtha was subjected to hydroreforming under the same conditions with the exception that the reaction was terminated after four hours, that is, before hydrogen sulfide appeared in the product. The timing of the second reaction was made from a study of the first reaction wherein portions of the effluent therefrom were tested until hydrogen sulfide was detected.

The effluent corrosive and non-corrosive naphthas from these two reactions were treated to solvent extraction using diethylene glycol as the solvent, a solvent to naphtha ratio of 10:1 at 90° F., and 15 p. s. i. g. pressure. The results are shown in the following table:

TABLE

*Production of non-corrosive naphthas by hydroreforming and solvent extraction*

| Hydroreforming | Charge Stock | 1st Portion | 2nd Portion [1] |
|---|---|---|---|
| Product Sulfur Distribution— Wt. Percent: | | | |
| Free—S | Nil | 0.001 | Nil. |
| $H_2S$—S | Nil | 0.002 | Nil. |
| RSH—S | 0.019 | Trace | Nil. |
| $R_2S_2$—S | 0.052 | Nil | Nil. |
| $R_2S$—S | 0.080 | 0.012 | 0.011. |
| Residual S | 0.007 | 0.009 | 0.007. |
| Total—S | 0.158 | 0.021 | 0.018. |
| Percent Aromatics | 4 | 40 | 40. |
| Doctor Test | Positive | Positive | Negative. |
| Lead Acetate Test | Negative | do | Do. |
| Mercury Test | Positive | do | Do. |
| Distillation-Corrosion Test | do | do | Do. |

[1] Reaction terminated before $H_2S$ appeared in product.

| Solvent Extraction | 1st Portion | | 2nd Portion | |
|---|---|---|---|---|
| | Raffinate | Extract | Raffinate | Extract |
| Percent Aromatics | 9 | 96 | 9 | 96. |
| Doctor Test | Positive | Positive | Negative | Negative. |
| Mercury Test | do | do | do | Do. |
| Distillation-Corrosion Test | do | | do | do |

Referring to the table, it is seen that the first portion of the naphtha which was processed without regard to the appearance of hydrogen sulfide in the effluent produced a corrosive naphtha. The second portion of the naphtha, however, processed in accordance with the invention produced an acceptable non-corrosive naphtha of high aromaticity. Raffinates produced by the above steps may be fractionated to produce high boiling naphtha fractions of selected aromatic content.

The solvents used in the extraction of aromatics from the hydroreformed product in accordance with this invention may be any solvent which is selective for the aromatics therein. The preferred species of such solvents include sulfur dioxide, phenol, furfural, and glycols, including diethylene glycol. The extraction is carried out by the employment of the usual liquid-liquid contact methods at temperatures from 0° to 100° F. The solvent to naphtha ratios may range from 1:15 to 15:1. The conditions employed will depend somewhat on the physical characteristics of the solvent and its known extraction efficiency. The pressures may be between atmospheric and 50 p. s. i. g.

The products from the hydroreforming reaction which has been terminated prior to the appearance of hydrogen sulfide in the effluent will contain about 40 to 50 percent aromatics. The conditions of solvent extraction are adjusted so that the finished raffinate will contain sufficient aromatics so that the higher boiling solvents fractionated therefrom contain about 15 to 25 percent aromatics, which is the content desired by most consumers of special naphthas. The extract naphthas from the solvent extraction step may be recovered and used as blending materials or disposed as such.

The catalytic materials used in the hydroreforming step of this invention are available commercially or may be prepared from raw materials. The preferred species of moybdena, cobalt molybdate, and copper molybdate, found to be particularly effective, may be used either singly or in admixture on the supports mentioned. Copper molybdate, also called copper permolybdate

$$Cu(MoO_4)_2 \cdot H_2O$$

is a greenish-yellow powder soluble in ammonia. It is a chemical compound or complex and is not the equivalent of a mixture of copper oxide and molybdenum oxide for many reactions. Copper molybdate or permolybdate may be formed from ammonium molybdate. Cobalt molybdate may be similarly prepared.

It is preferred that the molybdenum-containing catalysts be used on an inert carrier to insure intimate contact and simplify handling. The various well known co-precipitation, separate precipitation, impregnation, and simple mixing processes may be used to prepare the molybdena compound and the inert carrier for use in the process. To avoid any danger of fusing during use or regeneration, it is recommended that a maximum of about 8 to 10 percent by weight of copper as copper molybdate be used with the carrier. The molybdena and cobalt molybdate may be used in amounts from 5 percent to 20 percent by weight with the carrier. If a calcining step is used in the preparation, temperatures of about 900° to 1000° F. are sufficient to transform these catalytic materials into proper condition for use.

Another advantage of the invention is that the products after solvent extraction are free of the slight acrid odor that sometimes develops during the catalytic treatment of high sulfur naphthas. The development of this odor, which is due to a trace of sulfur dioxide in the products is avoided by terminating the reaction before the appearance of hydrogen sulfide therein. As a result, it is not necessary to employ a caustic wash step to remove any odorous materials.

The present invention may be carried out in several ways. First of all, the hydroreforming reaction may be actually terminated at or near the end of the period wherein no hydrogen sulfide appears as a product. This can be done by stopping the flow of reactant vapors into the reaction zone and/or diverting the collection of non-corrosive product from one product line from the reactor into another product line. One method of carrying out the invention would be to switch the product stream coming from the reactor into another conduit so as to collect separately the product formed during the period when no hydrogen sulfide appears from that product formed after hydrogen sulfide appears. This could be accomplished without terminating the reaction. Obviously, the latter product is not suitable as a specialty solvent because of its corrosiveness but it may be the source of aromatic hydrocarbons or be put to other uses, such as blending. Other methods may be employed as long as only that hydroreformed product or portions thereof issuing from the reaction, during the period when hydrogen sulfide is not a product, is separated and otherwise utilized. Having thus demonstrated the invention, the only limitations which apply thereto appear in the appended claims.

What is claimed is:

1. The process for producing naphthas which pass the distillation-corrosion test which comprises subjecting a 100° to 400° F. boiling range straight-run naphtha of petroleum origin to hydroreforming conditions at about 930° F., a pressure of about 225 pounds per square inch, with a space velocity of about 0.6 and a hydrogen circulation rate of about 2800 standard cubic feet per barrel in the presence of a catalyst comprising molybdenum oxide supported on alumina, segregating a hydroreformed product from said reaction during the period of said reaction in which hydrogen sulfide is not a product, and separating a non-corrosive naphtha having at least about 40 percent aromatics from said hydroreformed product.

2. The method in accordance with claim 1 in which the naphtha contains about 0.158 weight percent total sulfur compound before treatment.

3. The process for producing non-corrosive naphthas from petroleum hydrocarbon mixtures containing sulfur compounds which comprises subjecting said petroleum hydrocarbon mixtures to hydroreforming in the presence of a hydroreforming catalyst selected from the group consisting of molybdena, cobalt molybdate and copper molybdate, at temperatures from 900° to 1000° F., separating a hydroreformed product therefrom during the period of said reaction in which hydrogen sulfide is not a product, terminating said reaction before hydrogen sulfide appears as a product and separating hydrocarbon products from said hydroreformed product which are characterized by their ability to pass the distillation-corrosion test.

4. The process in accordance with claim 3 in which said petroleum hydrocarbon mixture is a 100° to 400° F. boiling range straight run naphtha.

5. The process in accordance with claim 3 in which said catalyst comprises molybdena supported on alumina.

6. The process for producing naphthas which pass the distillation-corrosion test from petroleum hydrocarbon mixtures containing up to about 1.0 weight percent total naturally occurring sulfur which comprises subjecting said hydrocarbons to hydroreforming in contact with a catalyst capable of promoting aromatization reactions selected from the group consisting of molybdena, cobalt molybdate and copper molybdate, at a temperature of from 900° to 1000° F., testing the effluent hydrocarbons from said reaction for the presence of hydrogen sulfide by applying the doctor test thereto, segregating a hydroreformed product from said effluent during the period of said reaction in which hydrogen sulfide is not a product and said doctor test is negative, and separating a non-corrosive naphtha of high aromatic content characterized by its ability to pass the distillation-corrosion test from said hydroreformed product.

References Cited in the file of this patent

UNITED STATES PATENTS

| | | |
|---|---|---|
| 2,325,034 | Byrns | July 27, 1943 |
| 2,498,559 | Layng et al. | Feb. 21, 1950 |
| 2,560,433 | Gilbert et al. | July 10, 1951 |
| 2,604,438 | Bannerot | July 22, 1952 |